Feb. 19, 1929.  
W. C. BUCKNAM  
1,703,057  
TUBE WELDING MACHINE  
Filed Feb. 12, 1925    6 Sheets-Sheet 1
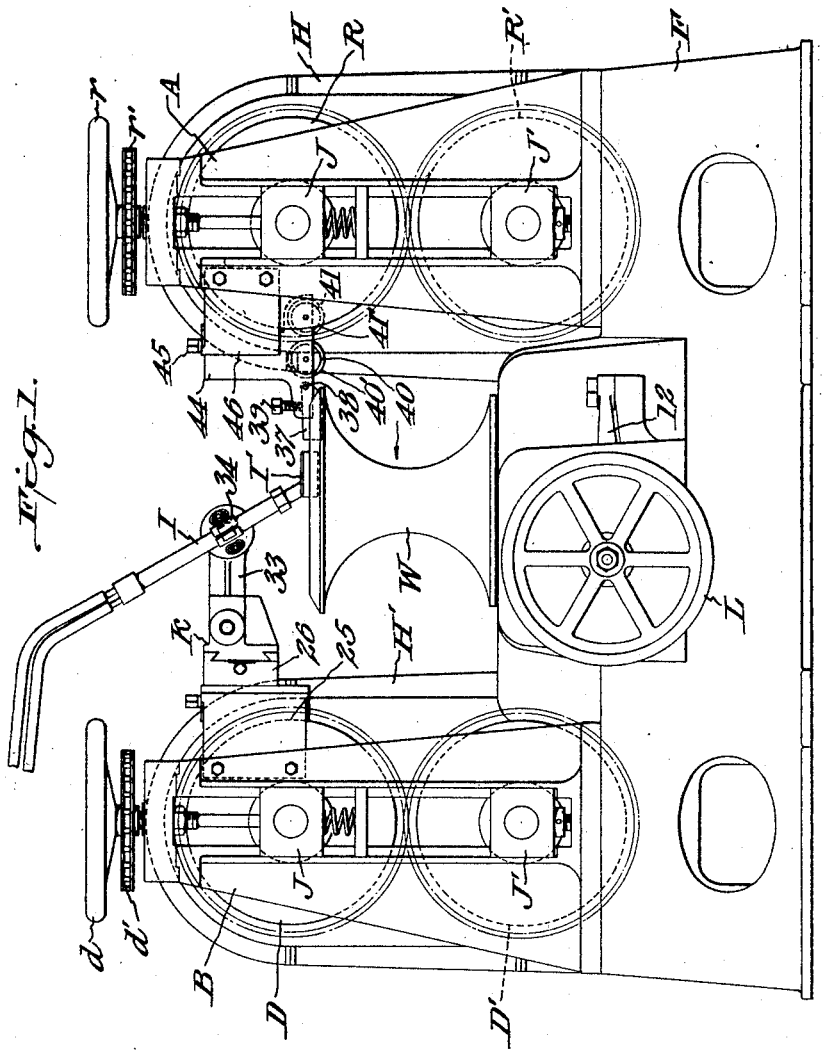
Inventor:  
Worthy C. Bucknam,  
By Byrnes Townsend & Brickenstein,  
Attorneys.

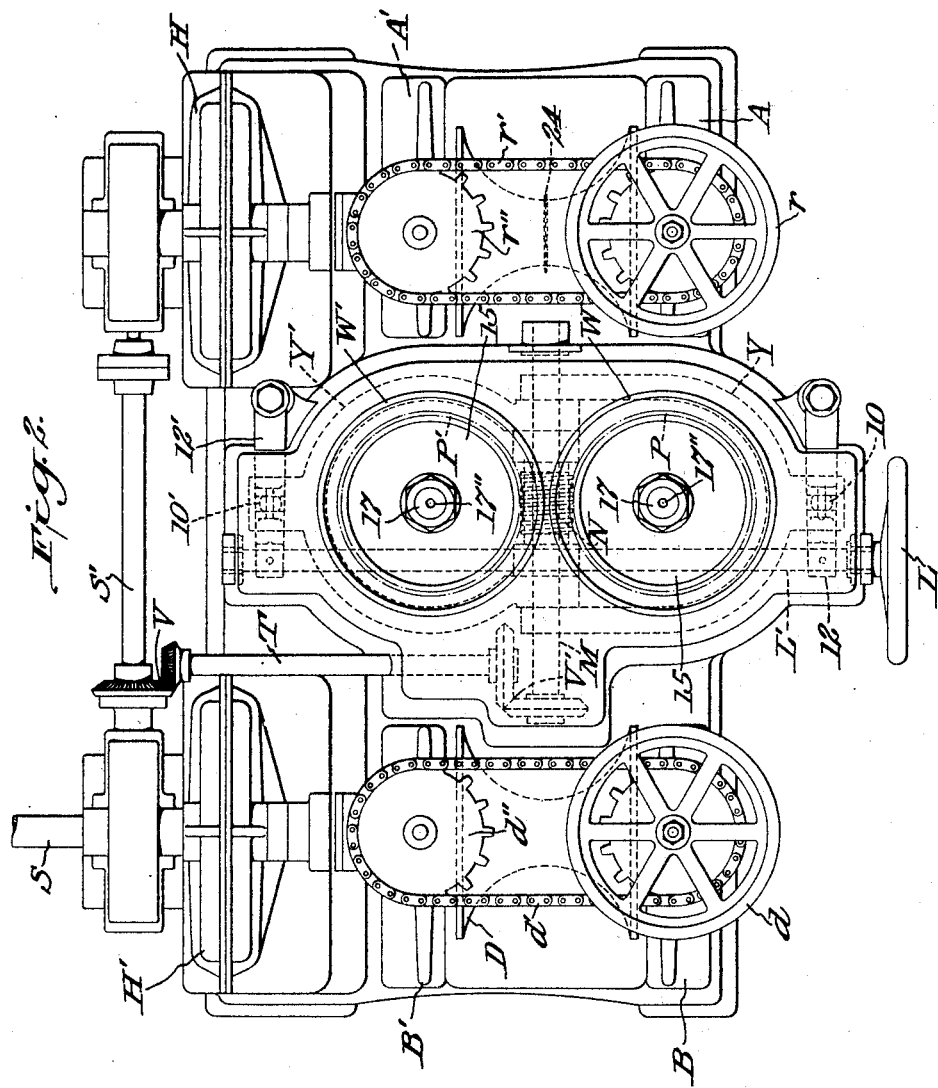

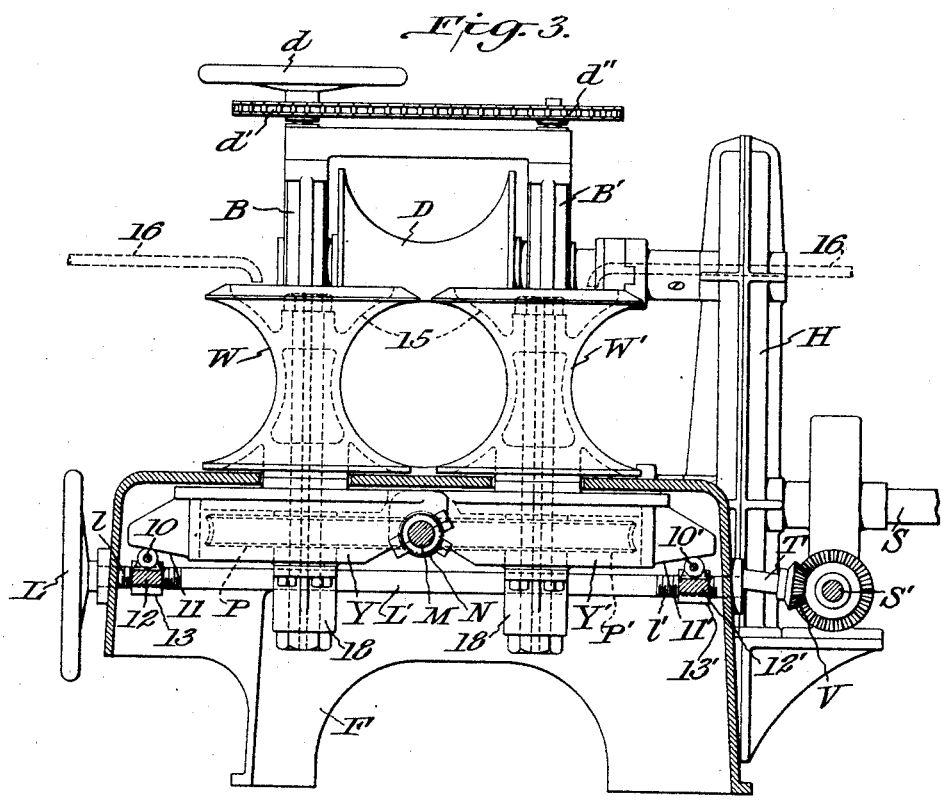

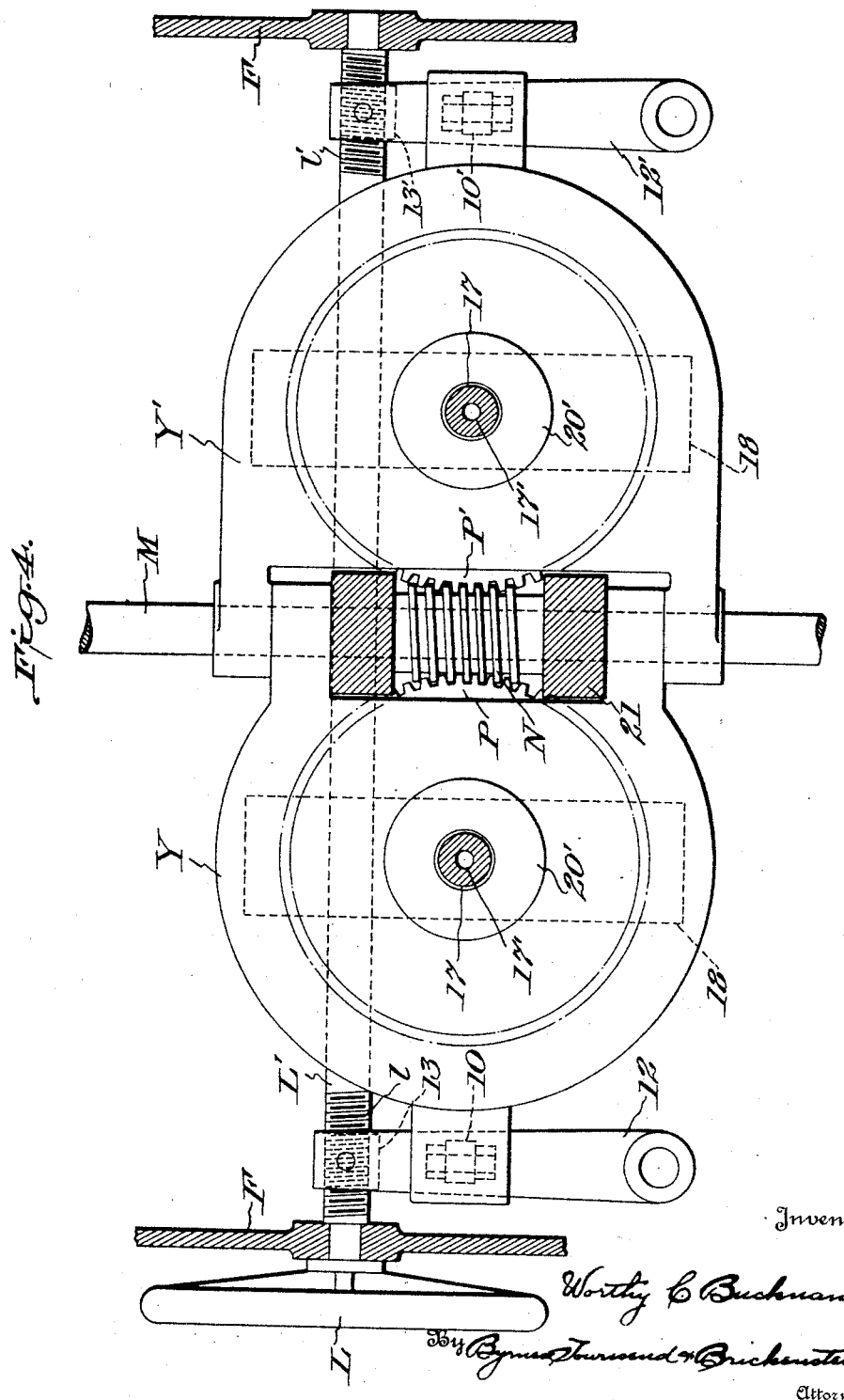

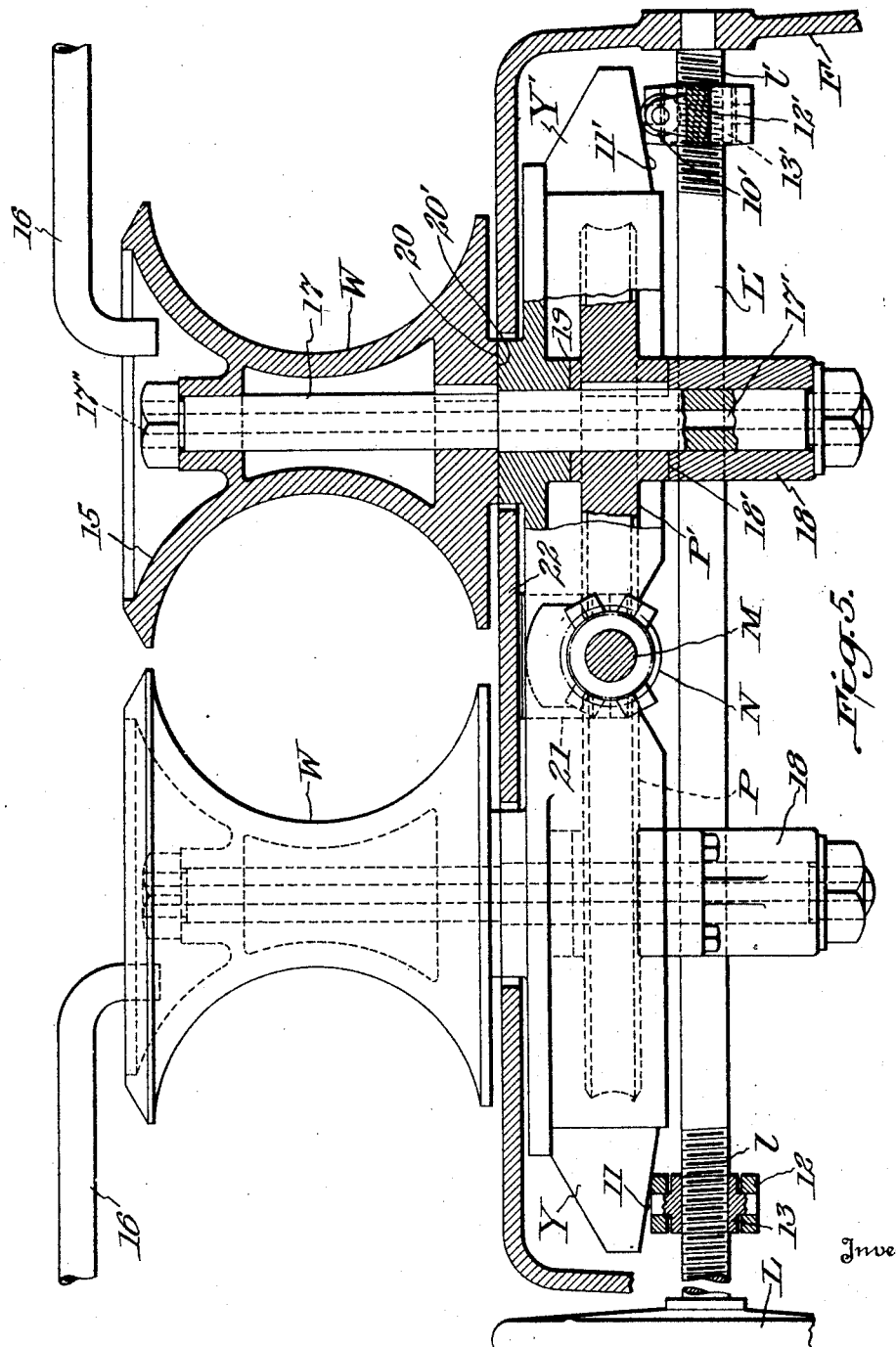

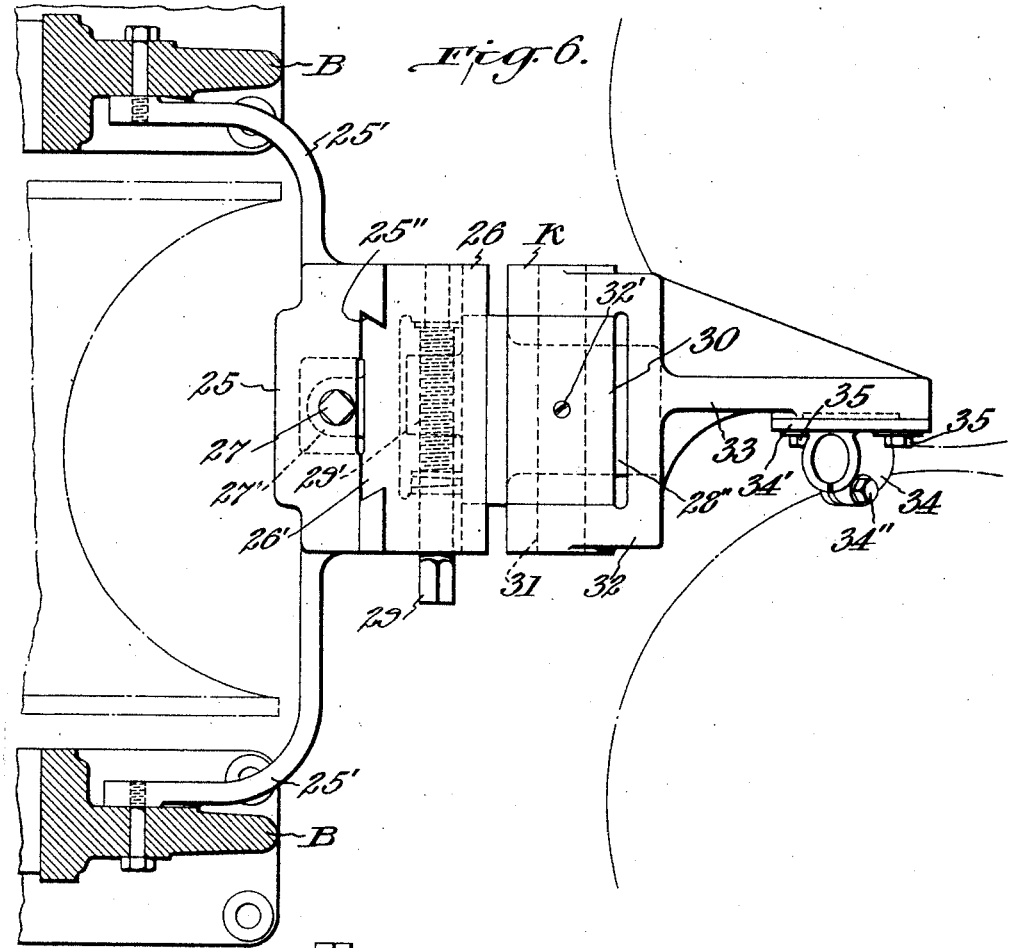
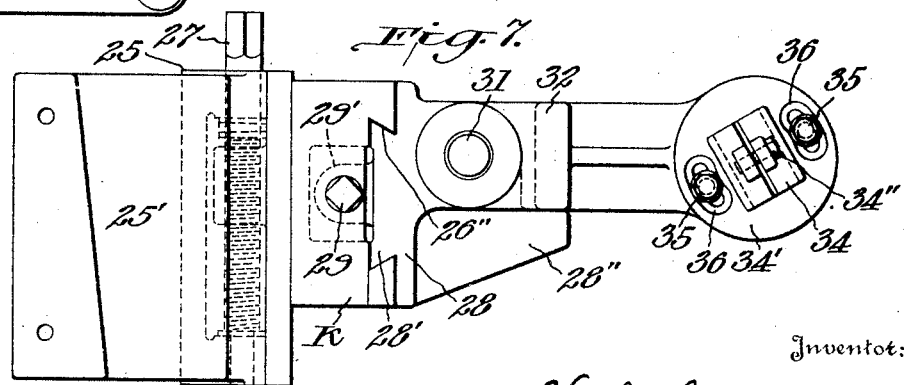

Patented Feb. 19, 1929.

1,703,057

UNITED STATES PATENT OFFICE.

WORTHY C. BUCKNAM, OF JERSEY CITY, NEW JERSEY, ASSIGNOR TO THE LINDE AIR PRODUCTS COMPANY, A CORPORATION OF OHIO.

TUBE-WELDING MACHINE.

Application filed February 12, 1925. Serial No. 8,775.

This invention relates to welding machines particularly adapted for autogenously welding the longitudinal seams of tubes by means of gaseous heating jets or flames, but certain features of the improved machine may be utilized in other types of welding machines and in machines employing heating and oxidizing gases for cutting metals.

Machines of the present type used for welding tubing generally have spaced pairs of receiving and discharging rolls designed to propel the preformed tube through the machine, and a pair of intermediate so-called pressure or welder rolls whose axes are disposed substantially perpendicular to the planes of the axes of the receiving and discharging rolls. The cooperating faces of the several pairs of rolls are shaped to substantially conform to the contour of the tube or other article to be welded. As the tube is fed through the machine, the longitudinal split therein is maintained directly above the tube axis and the blowpipe or other welding means is disposed approximately above the point at which the split in the tube passes between the welder rolls, the latter being adjustable to exert pressure transversely of the tube to hold the edges of the seam together during the welding action.

These welder rolls have generally been idler rolls.—that is to say, they have been driven only by frictional engagement with the tube that is otherwise propelled through the machine, as by the positively-driven receiving and discharging rolls. Such idler rolls, especially in machines for welding larger size tubes, have a retarding effect upon the movement of the tubes through the machine and otherwise hinder the satisfactory welding of tubes.

Accordingly, the primary object of this invention is to provide a welding machine in which the welder rolls shall be positively driven at the same speed as the receiving and discharging feed rolls, to overcome the foregoing disadvantages and increase the production of a given machine. A further and important object is to provide mechanism for varying the pressure of the welder rolls against the tubes while such rolls are being positively driven. Another object of this invention is to provide improved means for supporting the blowpipe or other welding device in operative position above and immediately in advance of the bight between the welder rolls.

The above and other objects and the novel features of this invention will be apparent from the following description taken with the accompanying drawings, in which Fig. 1 is a side view of a welding machine embodying this invention;

Figs. 2 and 3 are, respectively, plan and end views of the same, hidden parts being shown in dotted lines and some other parts being shown in section;

Figs. 4 and 5 are enlarged plan and sectional views illustrating the mounting, adjusting and driving means for the welder rolls; and Figs. 6 and 7 are views illustrating the improved blowpipe supporting means.

Referring to the drawing, the improved machine comprises a frame F, the opposite ends of which carry two pairs of vertical roll guides A, A' and B, B' having journals J, J' vertically adjustable therein and rotatably mounting pairs of horizontally disposed receiving rolls R, R' and discharging rolls D, D'. The cooperating welder rolls W, W' are rotatably mounted on upright shafts about midway between the receiving and discharging rolls.

All of these rolls are positively driven so that their peripheries run at the same speed, for which purpose any suitable power means may be employed, such as an electric motor coupled to an extended shaft S of the roll D'. As shown, power may be transmitted to the roll R' through a shaft S', and through gearing in the housings H, H' to the rolls R and D. While the welder rolls may be positively driven in various ways, the mechanism shown is particularly advantageous and comprises a common shaft M operatively coupled to the shaft S' by a cross shaft T and gearing V, V'. The shaft M carries a worm N that constantly meshes with worm wheels P, P' connected to the opposed rolls W, W'. Accordingly, when the shaft M is rotated the two welder rolls are simultaneously positively driven at the same speed and the adjoining cooperating faces thereof travel in the same direction to assist the rolls R and D in propelling the tube through the machine.

The welder rolls are also relatively adjustable to vary the pressure that forces the two heated edges of the tube seam together and unites them while the tube is moving through the machine. To this end the rolls W, W' are rotatably mounted on yokes Y, Y' rockable about the axis of the shaft M. As shown, these yokes have limbs perforated at one end to receive the shaft M upon which they are thereby pivoted, and the opposite or outer ends of the yokes are freely movable for adjusting the welder rolls toward and away from one another. Such adjustment may be effected in numerous ways, as by moving antifriction rollers 10, 10' inwardly and outwardly along the inclined surfaces 11, 11' at the outer ends of the yokes. The rollers 10, 10' are carried by the pivoted links 12, 12' which have swivelled nuts 13, 13' mounted at their outer ends and fitting the right and left hand threads 1, 1' on the shaft L' that may be turned in either direction by a handwheel L fast thereon.

The particular heating or welding means may comprise a gaseous welding jet, an electric arc welding electrode, or other suitable means. As shown, a blowpipe holder K is mounted on the rear roll guides B so as to support the nozzle I' of an oxy-acetylene blowpipe I directly above the seam and slightly in advance of the point where the welder rolls most closely approach each other, so that these rolls may squeeze the edges of the seam together and unite them directly after such edges have been brought to fusion temperature by the heating or welding jets. During this welding operation the welder rolls are continuously and positively driven at the same speed as the receiving and discharging rolls and will not exert a drag on the tube moving through the machine. Moreover, by simply turning the handwheel L in the proper direction the welder-roll supporting structures may be rocked about the common axis of the shaft M to swing such rolls toward or away from one another and thereby increase or decrease their squeezing action on the tube while the rolls are rotating. It will be seen that the welder rolls are adjusted in a transverse or vertical plane, and in swinging toward one another the squeezing action of the welder rolls is greatest at the part thereof closest to the seam, a gradually increasing circumferential pressure being exerted by each roll from the lower portion of the tube upwardly along its side toward the seam. Inasmuch as both rolls are driven from the same shaft and are rocked about the same axis the pressures exerted thereby will be substantially uniform and insure a more uniformly welded product. Of course, the worm gears P, P' will always remain in mesh with the single worm N, no matter in what adjusted position the welder rolls and their yokes are set.

As shown in Figs. 3 and 5, the welder rolls may be hollowed out at their upper ends, as at 15, and also intermediate their ends, to reduce their weight and expose more surface for cooling, the hollow upper end 15 serving as a receptacle for water or other cooling fluid which may be delivered thereto from a pipe 16. The cooling water may discharge through an overflow outlet 17'' which is the entrance of passage 17' extending lengthwise through the shaft 17 to which the welder roll is keyed. Suitable means may be coupled or otherwise associated with the lower end of the passage 17' to carry the waste water away from the machine. This circulation of water serves to effectively cool the rolls, especially the parts near the welding torch or electrode, and in addition cools the roll shaft and its bearings. Each shaft has a main bearing 18 bolted to the lower side of its supporting yoke, the upper surface of such bearing providing a bearing face 18' for an annular boss on the lower side of the worm gear carried by such yoke. Corresponding bosses on the upper side of the gear and the opposed surface of the yoke may provide cooperating bearings, as at 19; and the welder roll may have a boss 20 on its lower side cooperating with a boss 20' on the yoke to provide a bearing. Furthermore, suitable bearings 21 depending from a longitudinally extending frame member 22 may be provided to rotatably support the worm shaft M. Other types of bearings and cooling means may, of course, be employed.

The particular machine shown is designed for welding the longitudinal seams of range boilers, and the contours of the faces of the several pairs of rolls are therefore curved to fit circular tubes, but they may be otherwise shaped to conform to other work to be welded. The pressure between the pairs of receiving and discharging rolls may be varied by means of handwheels $r$ and $d$ which are connected directly to the journals at one end of the upper rolls of each pair and through chains and sprockets $r'$, $r''$, $d'$, $d''$ to the other ends of such rolls. Rotation of such handwheels in the proper direction increases or decreases the pressure as desired. The upper receiving roll R may also be provided with a central fin 24 that engages in the slit between the edges to be welded to assist in guiding the work and to prevent twisting of the same.

As shown in Figs. 1, 6 and 7, the particular welding means here employed consists of a blowpipe I adapted to receive oxygen and acetylene or other suitable gases and deliver the proper mixture to the nozzle I' from which the desired heating jets may be discharged along the opposed edges to be welded, desirably at a point immediately ahead of the point where the upper rims of the welder rolls most closely approach one another. A suitable support K is provided whereby different sizes and types of blowpipes may be adjusted as desired. As shown, the improved support comprises a bracket 25 provided with limbs 25' whereby it may be bolted to the discharging roll guides B. The front face of the bracket is vertically slotted at 25'' to receive the dovetail 26' of a slide 26, such dovetail having a nut 27' meshing with a screw 27 mounted in the bracket 25 and turnable in either direction to raise or lower the slide 26. Similarly, the slide 26 has a slot 26'' in its front face to receive the dovetail 28' of a second slide 28 that is adjustable horizontally by means of a screw 29 mounted in the slide 26 and meshing with the nut 29' on the rear of the slide 28. The slide 28 has a horizontal bearing 30 arranged to receive a pin 31 that engages apertures in the forked rear end 32 of an arm 33 which carries the blowpipe clamp 34. A forwardly projecting ledge 28'' of the slide 28 provides a stop that supports the arm in horizontal position but permits it to be swung upwardly to quickly move the blowpipe away from its welding position. A suitable set screw 32' is adapted to retain the pin 31 against movement. The clamp 34 may consist of a split member closable by a bolt 34'' and mounted on a base 34 that is secured to the arm 33 by bolts 35. The base of the clamp has arc-shaped slots 36 whereby it is further adjustable about a horizontal axis.

In welding larger tubes or shells additional means may be provided to guide the edges to be welded and keep them from overlapping at the blowpipe or welding means. As shown in Fig. 1, an elongated and relatively narrow presser foot 37 may be pivotally mounted near one end, as at 38, so as to project into the space between the squeeze rolls W, W' fairly close to the front end of the blowpipe nozzle I'. The presser foot 37 may be about an inch wide, so as to bear down upon the edges of the longitudinal split a short distance on each side of the latter to keep these edges from overlapping and in properly opposed position to be welded. Pressure on the pivoted foot 37 may be increased or reduced by turning a screw 39 or by other suitable means. Relatively narrow idler rolls 40, 41, having central peripheral fins 40', 41' adapted to engage in the longitudinal split of the tube, may be mounted between the receiving rolls and the presser foot to also serve to guide the tube and hold down the edges of the split. The presser foot 37, the adjusting screw 39 and the idler rolls 40, 41 may be mounted on a slide 44 that is vertically adjustable by a screw 45 in suitable ways in a bracket 46 similar to the bracket 25 and secured to the front roll guides A.

The operation of the machine will be apparent from the foregoing description. It will be obvious that the presser foot and auxiliary guide rolls may be omitted or replaced by other devices which will keep the split open and its edges properly positioned, and other types of blowpipe supports may be employed and various other changes may be made in the machine without departing from the spirit of the invention or sacrificing its advantages.

I claim:

1. In a welding machine, the combination of welding means, members cooperating to guide work past said welding means and operative to hold together edges of said work as they are united, means for simultaneously adjusting said members toward one another, and mechanism for positively propelling said members comprising a drive shaft, said members being adjustable about the axis of said shaft as a center.

2. In a welding machine, the combination of welding means, rolls rockable toward and away from one another about the same axis cooperating to guide work past said welding means and operative to hold together edges of said work as they are united, and mechanism for positively rotating said rolls.

3. In a welding machine, the combination of welding means, relatively adjustable rolls associated with said welding means to hold together edges of the work as they are united, mechanism for positively rotating said rolls comprising a drive shaft disposed in a plane between said rolls, and means operative to simultaneously adjust said rolls while they are rotating.

4. In a welding machine, the combination of means for delivering a gaseous welding jet, a pair of rolls rotatable about substantially upright axes and cooperating to guide work past such welding jet and to hold together edges to be united, mechanism for positively rotating said rolls comprising a drive shaft, and means whereby said roll axes are rockable toward and away from one another about the axis of said shaft.

5. In a welding machine, the combination of a pair of welder rolls and rockable about the same axis toward and away from one another, a pair of upright shafts carrying said rolls, mechanism geared to said shafts for positively driving said rolls, and means operable to vary the pressure between said rolls while they are being positively driven.

6. In a welding machine, the combination of means for propelling work through the machine; welder rolls for guiding said work and for holding together edges thereof to be united; single pivotal supporting means for said rolls whereby such rolls are bodily adjustable toward and away from one another about the same axis; and means for positively driving said rolls and said propelling means.

7. A welding machine comprising the combination of means for propelling work through the machine; pressure-applying welder rolls for guiding said work and for holding together edges thereof to be united; shafts for said rolls rockable about the same axis in a plane perpendicular to the direction of movement of said work; and means for positively driving said rolls and said propelling means.

8. A welding machine comprising the combination of means for propelling work through the machine; pressure-applying welder rolls for guiding said work and for holding together edges thereof to be united; a drive shaft common to said welder rolls; shafts for said rolls operatively connected to said drive shaft and rockable about the axis of the latter; and means for driving said propelling means and said drive shaft.

9. A welding machine comprising the combination of means for propelling work through the machine; pressure-applying welder rolls for guiding said work and for holding together edges thereof to be united; a drive shaft common to said welder rolls and substantially parallel to the direction of movement of the work; shafts geared to said drive shaft and operatively connected to said rolls; members carrying such roll shafts and rolls and simultaneously rockable about the axis of said drive shaft to vary the pressure between said rolls; and means for driving said propelling means and said drive shaft.

10. In a welding machine, the combination of welding means, pairs of receiving and discharging rolls for propelling work through the machine, adjustable welder rolls between said pairs of receiving and discharging rolls for guiding said work past said welding means and for holding together the edges to be united, means for positively driving said receiving and discharging rolls and said welder rolls, and means for simultaneously adjusting said welder rolls about the same pivotal axis disposed in a substantially vertical plane coinciding with the direction of movement of the work through the machine.

11. In a machine of the class described, the combination of cooperating rolls, adjustable frames rotatably supporting said rolls and rockable about the same axis as a center, means for driving said rolls at the same speed, and mechanism operative to adjust said frames to move said rolls toward and away from one another.

12. In a machine of the class described, the combination of a pair of adjustable supporting frames rockable about the same axis, a pair of cooperating rolls severally rotatably mounted on said frames, means for rotating said rolls comprising a single worm coaxial with said axis and geared to both rolls, and means whereby said frames are adjustable to move the rolls thereon toward and away from one another while such rolls are rotated.

13. In a machine of the class described, the combination of a pair of substantially horizontally disposed pivoted frames rockable about the same axis, a pair of cooperating rolls severally mounted on said frames and rotatable about substantially vertical axes, means for driving said rolls, and means whereby said frames are rockable to move said rolls toward and away from one another.

14. In a machine of the class described, the combination of a pair of cooperating rolls rotatable about substantially vertical axes; means for simultaneously driving said rolls at the same peripheral speed comprising a drive shaft, a worm on said shaft, and worm gears operatively connected to said rolls and meshing with said worm; a pair of frames rotatably supporting said rolls and worm gears in pairs and rockable about the axis of said drive shaft; and mechanism whereby said frames are adjustable to move said rolls toward and away from one another.

15. In a welding machine, the combination of a pair of receiving rolls rotatable about substantially horizontal axes; a pair of discharging rolls rotatable about substantially horizontal axes; a pair of welder rolls between said receiving and discharging rolls and rotatable about substantially vertical axes; means for positively driving said receiving, discharging and welder rolls at the same peripheral speed comprising a shaft geared to said welder rolls; adjustable frames rockable about the axis of said shaft and rotatably supporting said welder rolls; and mechanism for adjusting said frames to move said welder rolls toward and away from one another while they are being positively driven.

16. In a welding machine, a blowpipe support comprising a bracket adapted to be secured to the frame of the machine, a main slide adjustable relatively to said bracket, a second slide on the main slide and adjustable transversely of the direction of adjustment of the latter, an arm rockably mounted on the second slide and normally freely swingable upward, a stop on said second slide engageable by said arm when the latter is lowered, a blowpipe clamp, and means for adjustably connecting said blowpipe clamp to said rockable arm, said arm being freely swingable upwardly away from said stop, said clamp having a base, and such adjustable connecting means comprising slots in said base adapted to receive bolts for securing said clamp to the outer end of said arm.

17. In a welding machine, the combination of welding means, members cooperating to guide work past said welding means and operable to squeeze together edges of said work as they are united, and means projecting into the space between said members and operable to hold down such edges and prevent overlapping thereof when presented to said welding means.

18. In a welding machine, the combination of welding means, receiving rolls, welder rolls cooperating to guide work past said welding means and operable to squeeze together edges of said work to be united, and a presser foot between said receiving rolls and welding means operable to hold down such edges and prevent overlapping thereof when they are presented to said welding means.

19. In a welding machine, the combination of welding means, receiving rolls, welder rolls cooperating to guide work past said welding means and operable to squeeze together edges of said work to be united, a presser foot bearing down on the outer side of the work on opposite sides of the edges to be united to prevent overlapping thereof, and means between said receiving rolls and presser foot adapted to keep said edges separated and opposed to one another.

20. The combination with cooperating rolls, of means whereby said rolls are bodily pivoted to rock about the same axis, and means for adjusting said rolls toward and away from one another about said axis.

21. A welding machine comprising the combination of welding means; rolls cooperating to guide work past said welding means and to hold together edges of said work being united, said rolls being mounted on shafts disposed in the same plane and pivoted to swing in said plane about a common axis; and means whereby said rolls are relatively adjustable toward or away from one another about said axis.

In testimony whereof, I affix my signature.

WORTHY C. BUCKNAM.